United States Patent [19]

Aoki

[11] Patent Number: 4,987,556
[45] Date of Patent: Jan. 22, 1991

[54] HEATING COOKING APPLIANCE WITH RELAY TESTING

[75] Inventor: Masayuki Aoki, Ichinomiya, Japan

[73] Assignee: Kabushiki Kaisha Toshiba, Kanagawa, Japan

[21] Appl. No.: 439,864

[22] Filed: Nov. 20, 1989

[30] Foreign Application Priority Data

Nov. 29, 1988 [JP] Japan .................. 63-301528

[51] Int. Cl.$^5$ .............. G05B 19/02; G01R 31/02; G01R 31/32; H05B 6/64
[52] U.S. Cl. .............. 364/580; 364/551.01; 324/420; 324/422; 219/10.55 B
[58] Field of Search .......... 364/477, 580, 550, 551.01; 371/15.1, 17; 324/418, 420, 422, 537; 219/10.55 B, 10.55 C, 10.55 D, 10.55 R, 507, 508, 509; 340/517, 644, 789, 309.4

[56] References Cited

U.S. PATENT DOCUMENTS

4,158,431 6/1979 Van Bavel et al. ............ 340/309.4
4,275,464 6/1981 Schmidt ...................... 364/477 X Primary Examiner—Kevin J. Teska
Assistant Examiner—Edward J. Pipala
Attorney, Agent, or Firm—Philip M. Shaw, Jr.

[57] ABSTRACT

In a high frequency cooking apparatus including a magnetron, a fan motor, turntable motor, a plurality of relays for controlling them and a microcomputer controlling the relays, the microcomputer is provided with a relay test program. The relay test program is executed when specific two cooking menu selecting keys are simultaneously depressed. Consequently, pulses are sequentially supplied to all the relays and simultaneously, relay identification marks are sequentially displayed on a display unit. Based on the mechanical operation sound from each relay and the displayed content, an operator determines whether or not each relay is normal.

2 Claims, 7 Drawing Sheets

HEATING COOKING APPLIANCE WITH RELAY TESTING

BACKGROUND OF THE INVENTION

This invention relates to heating cooking appliances equipped with a microcomputer for controlling a plurality of relays so that the heating cooking operation is executed, and more particularly to such heating cooking appliances in which the microcomputer is provided with a function of testing the relays.

A high frequency cooking apparatus or microwave oven is, for example, provided with a plurality of relays which are controlled by a microcomputer so that various kinds of cooking modes are executed The high frequency cooking apparatus of the multifunctional type is provided with five or more relays. Conventionally, a series circuit of a light-emitting diode and a resistance is connected in parallel with each relay in order that each relay is tested for normal operation Each light-emitting diode is adapted to be activated when each relay is operated for test.

In the above-described arrangement, however, the light-emitting diodes and resistances are needed in accordance with the number of relays. Further, the size of a printed wiring board is increased as the number of light-emitting diodes and resistances is increased, resulting in large increase of the production cost of the high frequency cooking apparatus Moreover, in testing the relays, a tester needs to directly view each light-emitting diode provided on the printed wiring board. Accordingly, cabinets need to be successively detached from the high frequency cooking apparatus in the case that the relays are tested in repair or inspection after assembling, which complicates the testing work Additionally, the light-emitting diode is activated even in the case that the corresponding relay coil has burned out.

SUMMARY OF THE INVENTION

Therefore, an object of the present invention is to provide a heating cooking appliance wherein an expense for a relay testing device can be reduced and the relay testing work can be simplified.

To achieve the above-described object, the invention provides a heating cooking appliance including a microcomputer, a plurality of relays controlled by the microcomputer so as to be electrically closed and opened, control parts including a heat source operated by the relays, a large number of operation switches for supplying the microcomputer with cooking control instructions, and a display unit for displaying control status of the microcomputer. The microcomputer is provided with means for determining that one or more operation switches previously specified for setting a relay test mode have been manipulated, means for generating test operation signals so that the relays are sequentially operated for test for a predetermined period, based on the determination that the specified operation switches have been manipulated for setting of the relay test mode, and means for generating identification signals synchronously with the generation of the test operation signals so that identification marks representing the respective relays are sequentially displayed by the display unit.

When the operation switches are manipulated for selection of the predetermined test mode, the microcomputer operates to supply the relays with, for example, test operation pulse signals successively and further to successively generate the identification signals corresponding to the respective relays so that the identification marks corresponding to the respective relays are displayed on the display unit in turn. Upon operation, the relay clicks when an iron core of an electromagnet is attracted by an armature thereof to thereby collide with it. Viewing the identification mark on display, the tester listens to the clicking or operation sound of the rely synchronously with display of the identification mark.

When the relay does not click though the corresponding identification mark is on display, it is recognized that the relay corresponding to the identification mark on display is inoperative for some reason or other. Thus, since whether the relay is normal or not depends upon the operation sound therefrom, the cabinet need not be detached from the heating cooking appliance when the relays are tested in repair and inspection of the heating cooking appliance. Consequently, the testing work can be done quickly. Furthermore, in order that the microcomputer executes the relay testing operation and the identification mark displaying operation, the operation switches originally provided for the control of the heating cooking are utilized for selection of the relay test mode, for example, two of the operation switches are simultaneously oPerated, thus simplifying the operation for the relay test Additionally, exclusive parts need not be provided for the relay test, which minimizes the production cost of the heating cooking appliance.

The invention may also be practiced by a heating cooking appliance including a microcomputer, a plurality of relays controlled by the microcomputer so as to be electrically closed and opened, control parts including a heat source operated by the relays, a large number of operation switches for supplying the microcomputer with cooking control instructions, a start switch for initiating a heating cooking operation set by the operation switches and a display unit for displaying control status of the microcomputer. The microcomputer is provided with means for determining that one or more operation switches previously specified for setting a relay test mode and the start switch have been manipulated, means for generating test operation signals so that the relays are sequentially operated for test while the start switch is kept closed, based on the determination that the specified operation switches and the start switch have been manipulated for setting of the relay test mode, and means for generating identification signals synchronously with the generation of the test operation signals so that identification marks representing the respective relays are sequentially displayed by the display unit.

The relay testing operation and the identification mark displaying operation under the control of the microcomputer are executed only during the turn-on period of the start switch, improving the degree of safety.

Other objects of the present invention will become obvious upon an understanding of the illustrative embodiment about to be described or will be indicated in the appended claims. Various advantages not referred to herein will occur to one skilled in the art upon employment of the invention in practice.

DESCRIPTION OF THE PREFERRED EMBODIMENT

An embodiment wherein the invention is applied to a high frequency cooking apparatus will now be described with reference to FIGS. 1 to 4.

Figure 1:
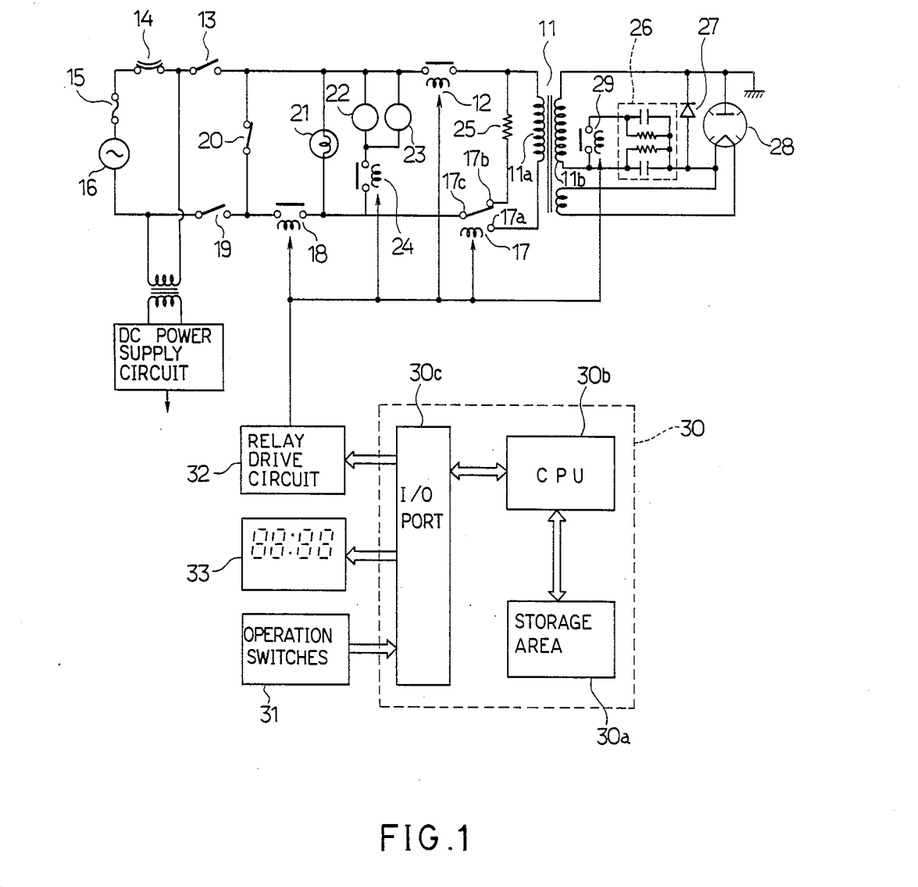
FIG. 1 is an electrical circuit diagram of a high frequency cooking apparatus of an embodiment of the invention.

Referring first to FIG. 1, one of the terminals of the primary winding 11a of a high voltage transformer 11 is connected to one of the output terminals of a power source 16 through contacts of a power control relay 12, a first door switch 13, a thermal switch 14 and a fuse 15 in turn. The other terminal of primary winding 11a is connected to the other output terminal of power source 16 through contacts 17b and 17c of a switching relay 17, contacts of a main relay 18 and a second door switch 19 in turn. A third door switch 20 is connected between terminals of first and second switches 13 and 19 at the side opposed to the power source. These switches 13, 19 and 20 are operatively associated with a door mounted for closing and opening one side of a heating or cooking chamber of the high frequency cooking apparatus. More specifically, first and second switches 13 and 19 are turned off when the door of the heating chamber is opened, thereby cutting off high voltage transformer 11 from power source 16. Third switch 20 is turned on when the door is opened Should an excessive current or the like cause contacts of each of switches 13 and 19 to be fused, fuse 15 blows out when the heating chamber door is opened, thereby cutting off high voltage transformer 11 from power source 16. A pilot lamp 21 mounted in the heating chamber is connected in parallel with third switch 20 through contacts of main relay 18. A parallel circuit of a fan motor 22 and a turntable motor 23 is also connected in parallel with pilot lamp 21 through contacts of a fan motor relay 24. Accordingly, pilot lamp 21 is lit when contacts of main relay 18 are closed, and fan motor 22 and turntable motor 23 are driven when contacts of fan motor relay 24 are closed. Switching relay 17 operates to selectively energize high voltage transformer 11 or a grill and oven heater 25 by switching contact 17c to contact 17b or 17a.

At the side of a secondary winding 11b of the high-voltage transformer 11, a high-voltage capacitor 26 and high-voltage rectifier 27 constitute a voltage doubler rectifier circuit so that high DC voltage is applied across anode and cathode of a magnetron 28. High voltage capacitor 26 comprises two capacitors which may be connected in parallel with each other. The net capacity of high voltage capacitor 26 may be changed by closing and opening contacts of a high voltage relay 29. High voltage relay 29 is energized and deenergized in accordance with the power source frequency, whereby the microwave output from magnetron 28 is rendered constant whether the rated power source frequency is 50 Hz or 60 Hz. The above-described relays 12, 17, 18, 24, and 29 are conventional electromagnetic relays.

Figure 2:
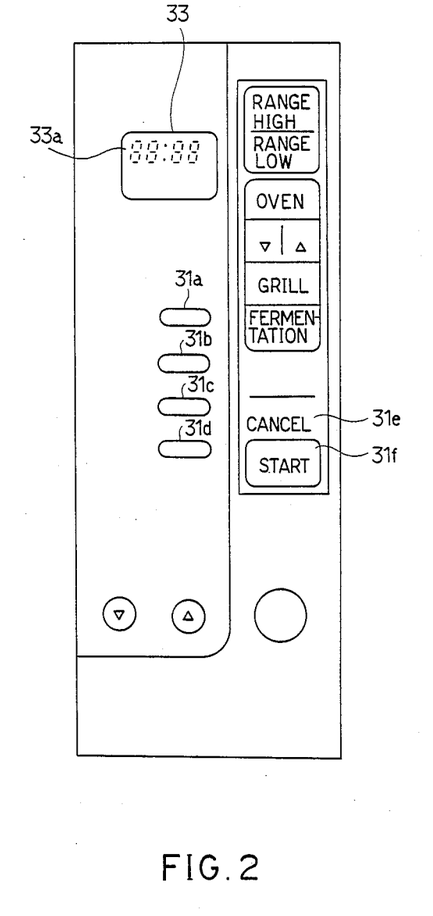
FIG. 2 is a front view of an operation panel of the high frequency cooking apparatus.

Operations of the high frequency cooking apparatus of the embodiment are controlled by microcomputer 30 in the centralized manner. Several kinds of programs are stored in a predetermined storage area 30a provided in microcomputer 30. Operation switches 31 are provided for an operator to input instructions on the cooking modes to microcomputer 30 and are disposed on an operation panel section as shown in FIG. 2. For example, operation switches 31 comprise four automatic cooking buttons 31a–31d for setting automatic cooking modes. In response to a signal from one of operation switches 31, a CPU 30b inputs the corresponding program from storage area 30a. Microcomputer 30 controls a relay drive circuit 32 through an I/O port 30c in accordance with the input program so that relay coils of relays 12, 17, 18, 24 and 29 are energized and deenergized. A display unit 33 is also provided in operation panel section for displaying contents of the automatic cooking mode selected by the automatic cooking buttons, in the form of characters (not shown). Further, display unit 33 is provided with a 7-digit numerical display section 33a for displaying the current time, a necessary cooking period or the weight of food to be cooked.

A relay test program for testing operations of the relays is stored in storage area 30a of microcomputer 30 as well as the above-described cooking programs. The relay test program is adapted to be selected by operating specific operation switches in the manner having nothing to do with any cooking operation. In the embodiment, the relay test program is selected to be executed by simultaneously operating two automatic cooking switches 31a and 31c.

Figure 3:
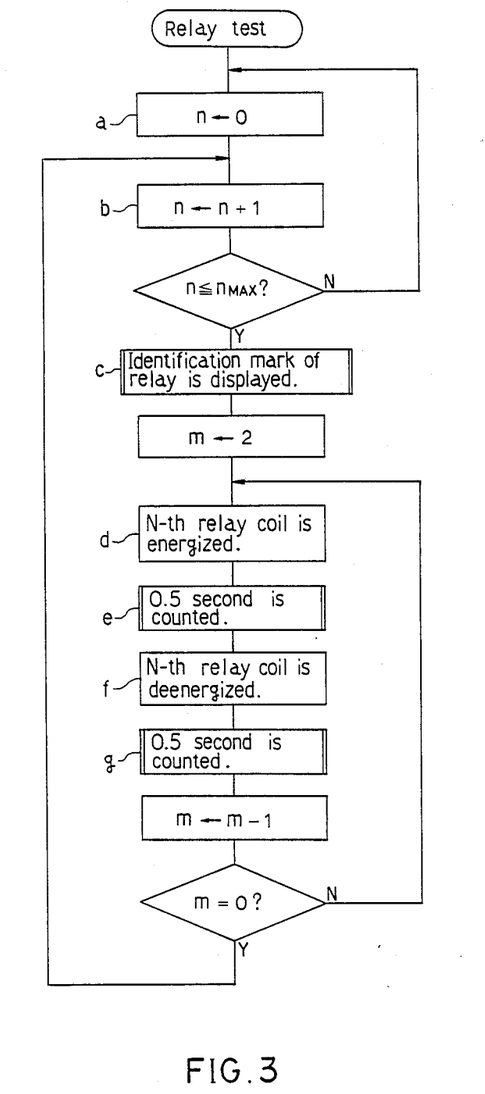
FIG. 3 is a flowchart showing contents of a program for the relay testing operation.

FIG. 3 shows contents of the relay test program. In FIG. 3, reference symbol "n" represents the numbers allotted to the respective relays. For example, the numbers 1 to 5 are allotted to relays 12, 17, 18, 24 and 29 in turn, respectively. Reference symbol "$n_{MAX}$" represents the total number of the relays and in the embodiment, $n_{MAX}$ is 5. Reference symbol "m" represents the number of times of energization of each relay coil for test operation of each relay.

In execution of the relay test program, "n" is initiated with 1 at steps a and b. An identification mark, L1 in the embodiment, of the relay represented by n=1 is displayed on numeric display section 33a of display 33 at step c. Microcomputer 30 generates a test operation pulse signal synchronously with display of L1 on display unit 33. The pulse signal is supplied through relay drive circuit 32 to the relay coil of power control relay 12 corresponding to n=1. The relay coil of relay 12 is energized for 0.5 sec. at steps d and e and subsequently, deenergized for 0.5 sec. at steps f and g. The energization and deenergization of the relay coil is again reiterated. Accordingly, 0.5 sec. energization of the relay coil is executed twice during 2 sec. Thereafter, returning to step b, microcomputer 30 operates to display an identification mark, L2, of the relay corresponding to n=2, on display unit 33 at step c. The relay coil of switching relay 17 corresponding to n=2 is energized and deenergized twice in the same manner as in the case of relay 12. Subsequently, the relay coils of the remaining relays are sequentially energized and deenergized twice in the same manner as described above, with the respective identification marks displayed on display unit 33. Even after the symbol "n" reaches 5, the above-described test operation is reiterated until a cancel switch 31e is turned on. The execution of the relay test program is interrupted when a cancel switch 31e is turned on during execution thereof.

Figure 4:
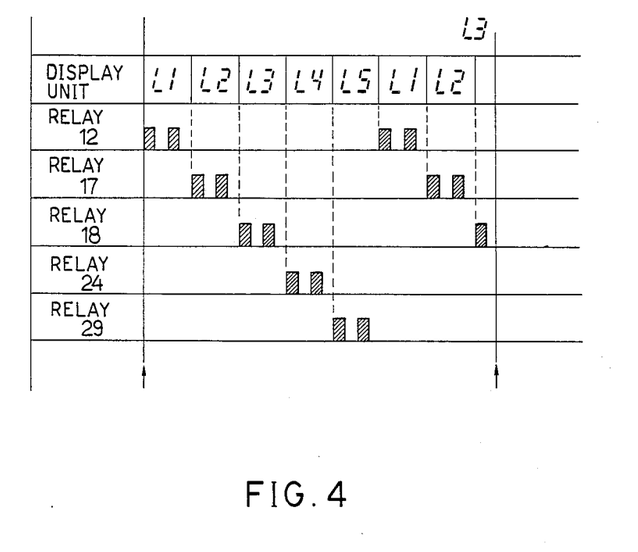
FIG. 4 is a time chart showing test operations of the relays.

FIG. 4 is a time chart showing the above-described execution of the relay test program. In FIG. 4, "display" refers to the content displayed on numeric display section of display unit 33. Obliquely lined blocks represent relay coil energized periods. Upon energization of each relay, if the relay is operative, the relay operates to thereby click or make a mechanical operation sound. Accordingly, in the case where the operator can listen to such mechanical operation sound when, for example, "L1" is on display, power control relay 12 corresponding to "L1" is regarded as normal. On the other hand, in the case where such mechanical operation sound is not heard when "L1" is on display, it is perceived that power control relay 12 or the drive circuit therefor is inoperative. Since the operation test is sequentially executed for all the relays, it does not take much time (10 sec. at the shortest) to test all the relays 12, 17, 18, 24 and 29. Since it depends upon the mechanical operation sound whether or not the relay is normal, the cabinet need not be detached from the high frequency cooking apparatus for the relay operation test. Specific switches maY be turned on to start the relay test program. Consequently, the testing work may be considerably simplified. Particularly, the invention is advantageous in the case where the relays are tested in repair and inspection of the high frequency cooking apparatus Furthermore, since the operation switches 31 and display unit 33 originally provided for the cooking operation are also utilized for the relay operation test, the number of parts is minimized and the design of the printed circuit board is unaltered. Consequently, the production cost of the high frequency cooking apparatus may be reduced in comparison with the prior art wherein an exclusive monitor circuit including LED's is necessitated for the relay operation test.

Figure 5:
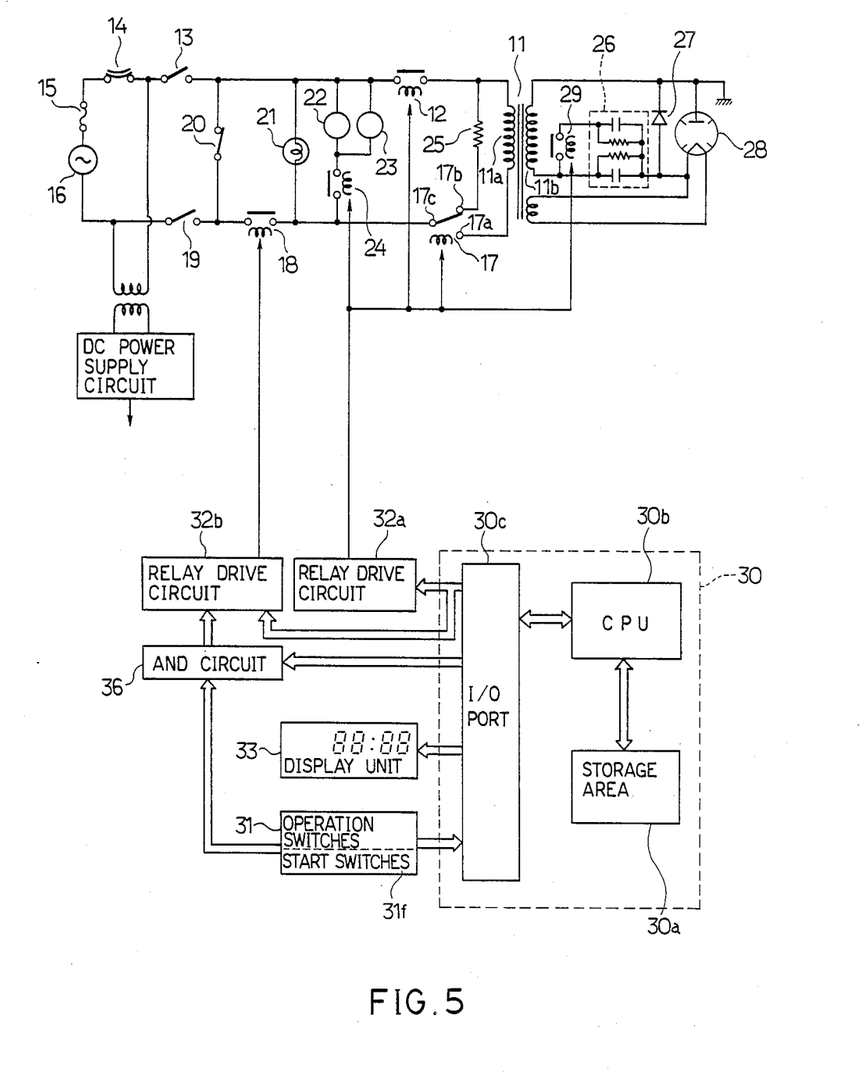
FIG. 5 is a view similar to FIG. 1 illustrating the high frequency cooking apparatus of a second embodiment of the invention.
Figure 6:
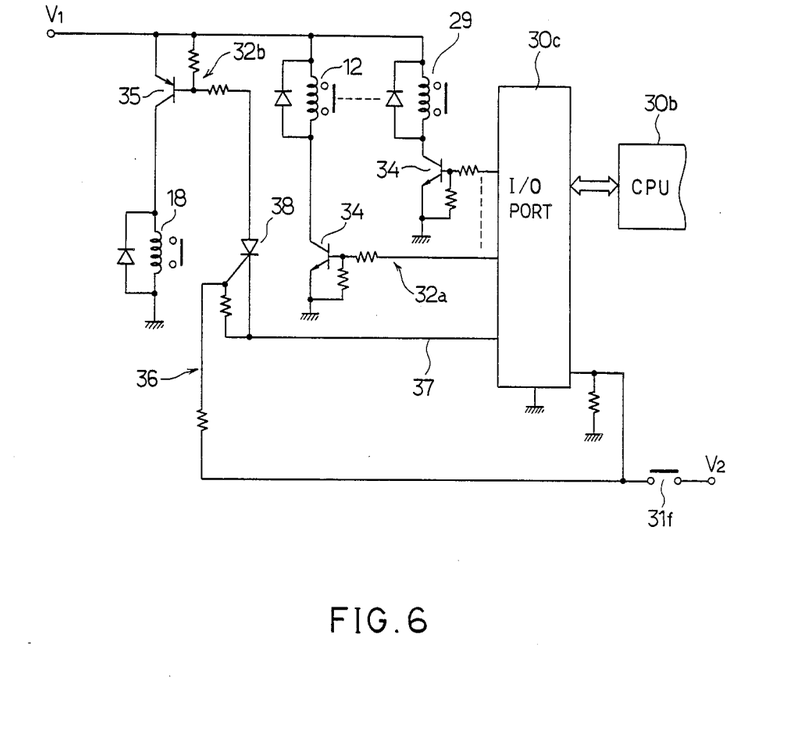
FIG. 6 is an electrical circuit diagram of the major part of the arrangement in FIG. 5.
Figure 7:
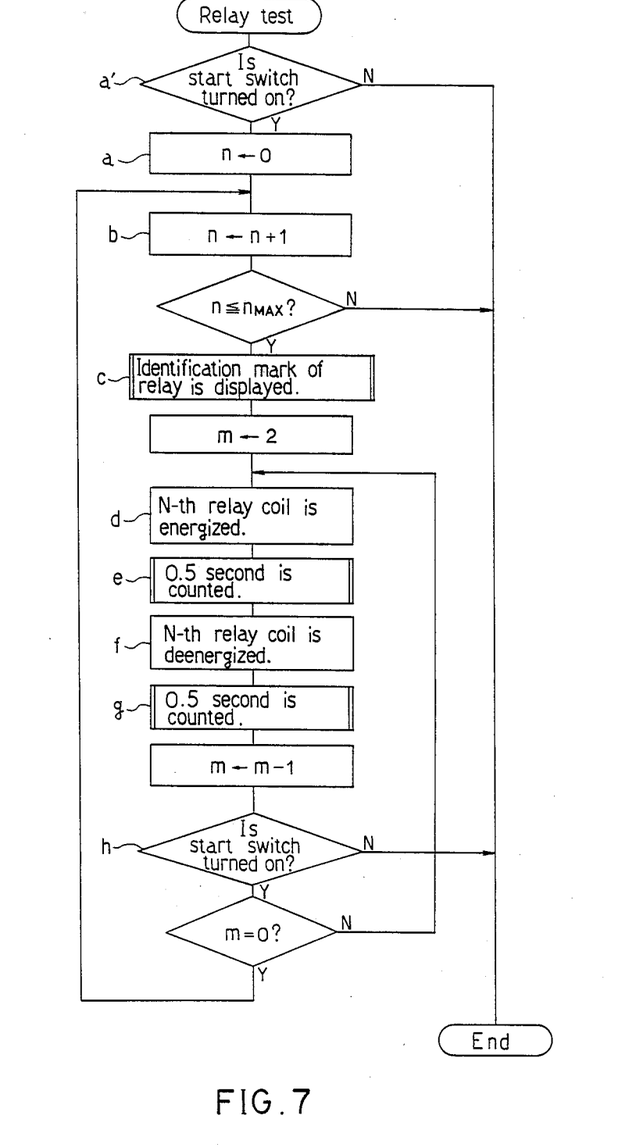
FIG. 7 is a view similar to FIG. 3 with respect to the second embodiment.

FIGS. 5 to 7 illustrate a second embodiment of the invention. Referring to FIGS. 5 and 6, relay drive circuit 32a for relays 12, 17, 24 and 29 (relay 17 is not shown in FIG. 6) comprises a transistor 34 and resistances. A relay drive circuit 32b for main relay 18 comprises transistor 35 and resistances. An AND circuit 36 comprising a thyrister 38 is provided for ANDing an output from start switch 31f(FIG. 2) provided on the operation panel with an output from a main relay drive output line of the output lines of the I/O port of microcomputer 30. An output of AND circuit 36 is supplied to transistor 35, thereby turning on and off the same.

In the second embodiment, the relay test program is executed when start switch 31f is closed after simultaneous depression of automatic cooking buttons 31a and 31c, as shown by step a' in FIG. 7. More specifically, when start switch 31f is closed after simultaneous depression of automatic cooking buttons 31a and 31c, the test program start signal is supplied to microcomputer 30. Relay drive signals or operation test signals are sequentially supplied to the bases of four transistors 34 and the anode of thyrister 38 through the respective relay output lines of the I/O port in the timing shown in FIG. 4, whereby the relays 12, 17, 18, 24 and 29 are sequentially operated for test as shown in FIG. 4. Since a gate signal is supplied to the gate of thyrister 38 only when start switch 31f is turned on, the relay test program is executed only while start switch 31f is kept closed. See FIG. 7. Accordingly, the relay test operation is prevented from being uselessly continued for a long time.

Although the two automatic cooking buttons 31a and 31c are simultaneously closed for execution of the relay test program in the foregoing embodiments, the relay test program may be executed by simultaneous operation of a plurality of the other automatic cooking switches or a plurality of switches including one or more switches other than the automatic cooking switches. Further, the power switch may be turned on simultaneously with turn-on of a specific operation switch. Further, the identification marks representing the resPective relays are not limited to those described above. Numerals or alphabet may be employed for that purpose. Or, the digits of numeric display section 33a or the segments of any digit may be used to represent the respective relays.

The invention may be broadly applied to heating cooking appliances wherein a plurality of relays are controlled by the microcomputer for execution of the heating cooking, such as an electric range wherein a sheathed heater is employed for the heating cooking, an automatic bread making apparatus wherein the kneading, fermentation and baking steps are automatically executed in sequence.

The foregoing disclosure and drawings are merely illustrative of the principle of the present invention and are not to be interpreted in a limiting sense. The only limitation is to be determined from the scope of the appended claims.

What I claim is:

1. A heating cooking appliance comprising:
   (a) a microcomputer;
   (b) a plurality of electromagnetic relays controlled by the microcomputer so as to be electrically closed and opened, the electromagnetic relays clicking when electrically closed,
   (c) control parts including:
      (i) a heat source operated by the electromagnetic relays,
      (ii) a number of operation switches corresponding to different cooking modes respectively so that each cooking mode is selected when each corresponding operation switch is operated, at least two of the operation switches corresponding to cooking modes which are different from each other being manipulated simultaneously for initiating a relay test mode, and
      (iii) a display unit for displaying the control status of the microcomputer;
   and wherein said microcomputer is provided with:
   means for determining that the two operation switches for initiating the relay test mode have been manipulated simultaneously,
   means for generating test operation signals so that the electromagnetic relays are sequentially tested, based on the determination that the two operation switches have been manipulated for initiating the relay test mode, each test operation signal comprising a plurality of pulses for each electromagnetic relay so that each electromagnetic relay is intermittently operated at a plurality of times and means for generating identification signals synchronously with the generation of the test operation signals so that identification marks representing the respective electromagnetic relays are sequentially displayed by the display unit.

2. A heating cooking appliance comprising:
(a) a microcomputer,
(b) a plurality of electromagnetic relays controlled by the microcomputer so as to be electrically closed and opened, the electromagnetic relays clicking when electrically closed,
(c) control parts including:
   (i) a heat source operated by the electromagnetic relays,
   (ii) a number of operation switches corresponding to different cooking modes respectively so that each cooking mode is selected when each corresponding operation switch is operated, at least two of the operation switches corresponding to cooking modes which are different from each other being manipulated simultaneously for initiating a relay test mode, and
   (iii) a start switch for initiating a heating cooking operation set by the operation switches, and
   (iv) a display unit for displaying the control status of the microcomputer;
and wherein said microcomputer is provided with:
means for determining that the start switch has been manipulated after the simultaneous manipulation of the two operation switches for initiating the relay test mode,
means for generating test operation signals so that the electromagnetic relays are sequentially operated for testing while the start switch is held closed, based on the determination that the start switch has been manipulated after the simultaneous manipulation of the two operation switches for initiating the relay test mode, each test operation signal comprising a plurality of pulses for each electromagnetic relay so that each electromagnetic relay is intermittently operating at a plurality of times and
means for generating identification signals synchronously with the generation of the test operation signals so that identification marks representing the respective electromagnetic relays are sequentially displayed by the display unit.

* * * * *